United States Patent
Stanislawczyk et al.

(10) Patent No.: US 7,455,909 B2
(45) Date of Patent: Nov. 25, 2008

(54) LATEX WITH ISOCYANATE CROSSLINKER AS BINDER FOR FIBROUS SUBSTRATES

(75) Inventors: Vic Stanislawczyk, Strongsville, OH (US); Mark W. Wolfinger, Strongsville, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 11/611,923

(22) Filed: Dec. 18, 2006

(65) Prior Publication Data

US 2007/0149077 A1    Jun. 28, 2007

Related U.S. Application Data

(60) Provisional application No. 60/753,137, filed on Dec. 22, 2005.

(51) Int. Cl.
  *B32B 27/00* (2006.01)
  *B32B 5/02* (2006.01)
  *B32B 27/02* (2006.01)
  *B32B 17/02* (2006.01)
(52) U.S. Cl. .................... 428/423.1; 442/152; 442/164; 442/180; 428/422.8
(58) Field of Classification Search ................ 442/164, 442/180, 152; 428/160, 423.1, 422.8
See application file for complete search history.

(56) References Cited

U.S. PATENT DOCUMENTS

| 3,269,860 | A |   | 8/1966  | Richardson et al. |
| 4,895,921 | A |   | 1/1990  | Schafer et al. |
| 4,918,135 | A | * | 4/1990  | Probst et al. ................ 524/714 |
| 4,929,495 | A |   | 5/1990  | Stanislawczyk |
| 5,021,529 | A |   | 6/1991  | Garrett |
| 5,030,507 | A |   | 7/1991  | Mudge et al. |
| 5,159,011 | A |   | 10/1992 | Rau et al. |
| 5,252,696 | A |   | 10/1993 | Laas et al. |
| 5,268,419 | A |   | 12/1993 | Stack et al. |
| 5,563,207 | A |   | 10/1996 | Brahm et al. |

FOREIGN PATENT DOCUMENTS

GB      1162409 A      8/1969

* cited by examiner

*Primary Examiner*—Lynda Salvatore
(74) *Attorney, Agent, or Firm*—Samuel B. Laferty; Joe A. Powell; Thoburn T. Dunlap

(57) ABSTRACT

A polymeric dispersion in aqueous phase for use as a polymeric binder for paper and other nonwoven articles is described utilizing a polyisocyanate in combination with said polymeric binder to increase the ratio wet tensile/dry tensile strength. The polyisocyanate seems to be functioning by increasing the fiber to binder interaction rather than by simply increasing the strength/crosslink density of the binder. The polyisocyanate can be blocked isocyanate(s) or water dispersible isocyanate(s). The binder may or may not have isocyanate reactive species along the backbone.

12 Claims, No Drawings

LATEX WITH ISOCYANATE CROSSLINKER AS BINDER FOR FIBROUS SUBSTRATES

CROSS-REFERENCE TO RELATED APPLICATION

This application claims priority from Provisional Application Ser. No. 60/753,137 filed on Dec. 22, 2005.

FIELD OF THE INVENTION

Paper formed without a sizing or binder tends to have low wet tensile strength. Various binders and sizings have been used in paper and other nonwovens (nonwoven constructions) to increase the tensile properties. The binders and sizings can co-react with the fibers of the nonwoven construction. A property of particular interest in characterizing the tensile properties of papers and other nonwovens is wet to dry tensile ratio, a comparison between the strength of the bound paper/matt in the wet state versus a dry state.

BACKGROUND OF THE INVENTION

U.S. Pat. Nos. 4,929,495 and 5,021,529 teach carboxylated acrylate polymers for nonwoven fabric and formaldehyde-free self-curing interpolymers for paper and other nonwoven fabrics respectively. Crosslinlking of the latex binder may be brought about after latex drying to obtain the highest tensile properties. Crosslinking approaches employing methylol groups, either incorporated into the polymer binder, or through addition of a crosslinking agent, for example, melamine-formaldehyde resin, are commonly used. Methylol chemistry produces formaldehyde during curing, which can be objectionable. Further, relatively high temperatures (approximately 150° C.) are typically required to initiate the methylol crosslinking reactions. The high temperatures needed for some crosslinking reactions limit processing speeds, and add to energy costs in producing the bound paper or nonwoven.

Water dispersible polyisocyanates, such as disclosed in U.S. Pat. Nos. 5,252,696 and 5,563,207, from reacting polyisocyanates with monofunctional polyether alcohols containing ethylene oxide repeating units are known components in coating compositions where they can react with isocyanate reactive groups in aqueous coating compositions. Under proper reaction conditions, these materials can be dispersed in water without a significant amount of less desirable side reaction between the isocyanate group(s) and water occurring in the normal time period for use of the dispersed isocyanate containing mixture. In coating compositions, the inclusion of the water dispersible polyisocyanates results in higher crosslink density than in similar coating compositions without water-dispersible polyisocyanates.

Blocked polyisocyanates are used in water containing compositions to prevent the reaction of the isocyanate group(s) with water. Subsequent to water removal by evaporation, the blocked isocyanates can be unblocked, such as with heat, and regenerate the reactive isocyanate group that can then react with active Zerewitinoff hydrogen containing compounds. One such blocked polyisocyanate is described in U.S. Pat. No. 4,895,921.

U.S. Pat. No. 5,268,419 discloses a fast curing binder for cellulose comprising a solution copolymer of an olefinically unsaturated organic compound having at least one carboxylate groups, which is reacted with a primary or secondary amide of an olefinically unsaturated carboxylic acid. The product of said reaction is admixed with a non-formaldehyde containing latex carrier to produce a binder composition which reaches substantially fully cured wet strength in 8 seconds or less. U.S. Pat. No. 5,030,507 teaches emulsion binders which do not generate formaldehyde during cure. They utilize 2-20 parts meta or para-isopropenyl-$\alpha,\alpha$-dimethyl benzyl isocyanate. The products are heat resistant flexible products for use in roofing, flooring and filtering materials as well as facings and other applications in general purpose nonwoven products.

SUMMARY OF THE INVENTION

It was unexpectedly found that small amounts of blocked or water dispersible polyisocyanate compounds when added to non-oleophilic fibrous materials and dispersed polymer binders, resulted in high tensile properties, in particular wet tensile strength and higher ratio of wet:dry tensile in several paper and/or nonwoven constructions. It was noted that the higher tensile strength and lower elongation to break were achieved without extensive curing of the nonwoven and binder at elevated temperatures. While not wanting to be bound by theory, it would seem that the blocked or water dispersible polyisocyanates are acting to improve the interaction between the fibrous material and the dispersed polymers. When so used, they generate earlier tensile properties and/or higher ratios of wet:dry tensile properties, perhaps by reacting with the paper fibers and/or the polymer binder, or perhaps by modifying the fiber surface to strengthen physical interactions between the polymer binder and the fibers. It is noted that both the wet and dry samples (when cured) are cured for the same time so differences in extent of crosslinking of the polymer should be minimal when looking at the ratio of wet:dry tensile strength. It is noted that the polymer binder need not have substantial amounts of reactive hydroxyl or amine groups, which is typically needed for isocyanate crosslinking reactions at lower temperatures.

DETAILED DESCRIPTION OF THE INVENTION

Binder compositions comprising a dispersed polymer phase in water in combination with dispersible polyisocyanate compounds, blocked isocyanates, or combinations thereof are described. When non-oleophilic fibrous materials in any form such as sheet, bundle, dispersion, etc., are added to the binders, higher tensile properties earlier in the initial cure of the polymer and higher ratios of wet:dry tensile at various levels of cure are observed in several paper and/or nonwoven constructions. The binders are very different from films and coatings from polymer dispersions as the binders modify the fibrous construction by adhering the fibers together, with fibers being the strength imparting agent. In films and coatings, the polymer is often a primary stress bearing element and any fibers or particulate in the film only toughens the film or coating. Also in coatings, the polymer is generally the major component and fibers or particulate are minor components. In fibrous constructions, the fibers are the major component and the binder is generally a minor component relative to the fibers.

A benefit of the combination of binder and blocked and/or dispersible polyisocyanates is that one can more quickly after assembly handle the fibrous construction and/or apply stress and strain to the fibrous construction without as much concern about tearing or deforming the fibrous construction. When it is necessary to handle, transport or process the fibrous construction after exposure to solvent or water, the increased ratio of wet:dry tensile strength minimizes a) concern and processing difficulties, b) deformed constructions, and/or c) torn constructions. There is also a possibility of using less binder or a lower binder to fibrous material ratio to achieve equivalent dry or wet strength in the fibrous construction.

The dispersed polymer phase in water can be from a variety of sources. Typically, it is a commercial polymer having major amounts of a) acrylic or acrylate monomers therein; b) acrylonitrile in combination with other monomers such as styrene, butadiene, or acrylate; or c) styrene or a substituted styrene in combination with a diene such as butadiene. These polymers typically have a major amount of the listed monomers and minor amounts of a variety of other monomers to impart various particular properties. They generally have a glass transition temperature as measured by DSC of from about −70° C. to about 120° C., depending largely on the end-use stiffness requirements for the fibrous construction. A sandpaper construction may require a stiffer binder than a wet wipe construction. These dispersed polymer phases can be made by emulsion polymerization or dispersion polymerization processes. The water phase (aqueous media) may contain water soluble hydrocarbons and or the dispersed polymer may contain water insoluble hydrocarbon diluents (e.g., plasticizer or coalescents). Typically, these dispersions have a polymeric or lower molecular weight surface active compound of the anionic, cations, nonionic type or blends thereof to help maintain the dispersed polymer phase during formation and storage of the dispersion of polymer. The surface active compound may also play a role in dispersing the polyisocyanate into the system.

The monomers used to make the polymeric binder can be selected from a large list of ethylenically unsaturated (including diene monomers in this description) monomers well known to the art that polymerize through reactions of carbon to carbon double bonds. Common monomers used in major amounts these applications include the acrylic and acrylate monomers represented by the formula $C(R^1)(R^2)=C(R^3)COOR^4$ where $R^1$, $R^2$, $R^3$, and $R^4$ are H, linear or branched alkyls or alkenyls of 1 to 20 carbon atoms. When used in major amounts in preferred embodiments, $R^1$ and $R^2$ are typically H, $R^3$ is typically an H or a lower alkyl such as $C_1$-$C_4$ alkyl and $R^4$ varies from H and $C_1$-$C_8$ or $C_{12}$ alkyls. These may also be referred to as $C_1$-$C_8$ alkyl(alk)acrylates of acrylics with the (alk) term meaning the $R^3$ component may be hydrogen (absent any alkyl groups) or a lower alkyl of 1 to 4 carbon atoms. When $R^4$ is H, the molecule is specifically an acrylic monomer and when $R^4$ is an alkyl the molecule is specifically an acrylate. Minor amounts of other acrylic and/or acrylate type monomers may also be present such as those where $R^4$ includes an epoxy group, a hydroxyalkyl group, an amine, etc., or $COOR^4$ (ester linkage) is replaced by an amide linkage, etc. Minor amounts of other specialty monomers such as those containing phenones, polycarboxylic acids (e.g., itaconic acid, maleic acid, maleic anhydride, etc.), vinyl acetate, isocyanate containing monomers (optionally with the isocyanate being blocked), etc., may be included. Major or minor amounts of acrylonitrile and various alkyl substituted acrylonitriles may be in the polymer. Major or minor amounts of the styrene and various alkyl substituted styrenes (e.g., para or alpha alkyl, etc.) may be included. Major or minor amounts conjugated dienes of 4 to 8 carbon atoms (such as butadiene, isoprene, etc.) could be included. Major amounts of a particular monomer or monomer type for the purpose of this application will be thirty (30) percent or more by weight based on the total polymer weight for the purposes of this application. These and other suitable monomers are listed in U.S. Pat. No. 5,156,718 in column 1, line 50 through column 2, and line 19.

The polymer of the binder can exist as a dispersed phase due to a variety of circumstances. Many of the polymers are made as latexes via emulsion polymerization processes, which are well known to the art. This typically involves starting with a continuous phase and monomers and nucleating polymer particles in the continuous phase and growing those particles by the addition of monomer to the particles and polymerization of the monomer into polymer. Many acrylic and styrene-butadiene polymers such as used in the examples are made by such processes. Polymer dispersions may be made by polymerizing the monomers in other polymerization processes and then physically dispersing the polymers in a continuous phase. Solution polymerization processes, followed by removal of the solvent and dispersing in aqueous media can also be used to form suitable polymer binders. Mixtures of polymers dispersions formed by different processes or containing significantly different polymers may be used. It is particularly anticipated that the polymers may possess blocked isocyanates or other isocyanate functionality (such as in the water-dispersible polyisocyanates) to facilitate interaction with the added polyisocyanate components.

The non-oleophilic fibers or fibrous material can be a variety of polymers or high modulus polymer-like materials, e.g., carbon fibers that are not pure hydrocarbons. Excluded are polyethylene, polypropylene, etc., which are known as olefin polymers and consist almost entirely of carbon and hydrogen. It is not anticipated that dispersible or blocked polyisocyanates would improve properties for fibrous constructions for these very oleophilic fibrous substrates. Included in fibrous materials that would benefit from the dispersible or blocked polyisocyanates are cellulose including various variations such as wood fibers, cottons, processed cellulose, modified cellulose; condensation polyesters from polyacids and polyols or from hydroxycarboxylic acids; polyester from chain polymerizations such as acrylics and/or acrylates; acrylic polymers containing acrylonitriles repeat units, condensation polyamides (such as nylons), fiberglass, carbon fibers, etc. Preferred fibers in one embodiment are those of wood, cotton, and processed or modified cellulose. Preferred fibers in another embodiment are the polyesters, acrylates, and acrylics. Preferred fibers in a third embodiment are fiberglass. These are generally characterized by heteroatoms such as nitrogen or oxygen, in addition to carbon and hydrogen being present in each repeat unit. While not wishing to be bound by theory, it is theorized that these more polar (less oleophilic) fibers could be more easily wet and the binder could more readily spread on the fiber surfaces if an intermediate such as dispersible or blocked polyisocyanates were present. Additionally, the presence of isocyanate reactive groups on the fibers, for example, hydroxy or amine groups may result in chemical linkage of the isocyanate component to the fiber(s) via a urethane or urea type linkage.

The various dimensions of the fibers (an essential component of the fibrous construction) are not considered critical to the improvement imparted by the dispersible or blocked polyisocyanates. Thus, the aspect ratio (generally length to some diameter type measurement), overall length, diameter, distribution of lengths or diameter will be only briefly discussed in relationship to those parameters necessary or desirable to make good fibrous constructions. It is generally the case that the diameters of the fibers are larger, in some embodiments one, two or three orders of magnitude or more than diameters of the polymer dispersions used as binder.

To qualify as fibers the material of the fibrous construction would have to have a length to diameter ratio of at least 2:1 and possible 5:1 or more, 10:1 or more, or 100:1 or more. Different fiber lengths and fiber properties are desired for different properties in the fibrous construction. High tensile strength fibers with low modulus to bending would provide a supple fibrous construction that would be strong but flexible. This might be a reinforcing element for a plastic composite or a fabric for use in a personal care item. Low tensile strength fibers with high modulus to bending would form a weaker mass in tensile but with more stiffness. This might be a roofing felt. Of course, the fiber properties could be optimized for any final application. The fibers of the fibrous construction can be obtained from a variety of sources. The cellulosic fibers, wool, cotton, etc., have been commercially available prior to synthetic polymers. The synthetic polymers are often formed into fibers by spinning process or extrusions of molten fibers.

The amount of binder in the fibrous composite can also affect the strength and feel of the fibrous mass. High loadings of binder throughout the mass would tend to form the stiffer and stronger fibrous construction than lower loadings of binder, other variables remaining constant. One could intermittently apply the binder in various patterns to specific portions of the fibrous mass. This would tend to reduce both strength and stiffness by allowing binder to glue some intersections of the fibers together while allowing other intersections of fibers not to be glued or adhered together. The glass transition temperature of the binder would also have an effect on the stiffness of the nonwoven construction, higher glass transition temperature binders would result in stiffer constructions.

The binder could be applied to the fibers while the fibers were discrete fibers and before they were collected into a fibrous mass. The binder could be applied to the fibers as a blend of fibers and binders and then excess binder could be removed. The fibers could be formed into a fibrous mass and then the binder could be saturated or printed onto the fibrous mass. The binder could be added in a salvation process or a beater-add process. These and a variety of other commercially practices methods of assembling the fibrous mass and binder are contemplated.

When a water or solvent based binder is used with a fibrous composite, usually the binder and fibers will be brought together by one of the methods described above and then the water or solvent will be removed be evaporation. The non-woven fibrous construction can optionally be made in a four-drinier machine from a slurry of fibers, where an endless screen or roll press forms a sheet which is optionally dewatered and dried over drying cans, cooling cans, calendar and wound on a reel. These are common in papermaking. The dispersed polymer phase will coalesce in the crevices between the fibers and onto the fibers. It is anticipated that many disperse polymer particles might coagulate near an interface between two fibers and form an adherent layer or mass between two fibers. Alternatively, the binder may coat all of the fibers and form an adhesive mass where the coated fibers overlap each other. The fibers may contain a sizing or tie layer prior to applying the binder.

The polyisocyanate may be selected from a variety of sources having two or more isocyanate groups per molecule, or in the case of blocked polyisocyanates, where two or more isocyanate groups per molecule can be generated by heating reactions that regenerate isocyanate groups and the blocking molecule from chemically blocked isocyanate groups. The polyisocyanate can include both water dispersible aspects and blocked isocyanate aspects such as disclosed in U.S. Pat. No. 4,895,921. Blocked isocyanates rely on particular blocking groups that temporarily react with the isocyanate groups to form thermally unstable bonds. At elevated temperatures, the thermally less stable bonds between the isocyanate and blocking agent break releasing the original starting materials. This allows the polyisocyanates to be in contact with water while blocked and then after removal of any water the isocyanate groups can be regenerated. Examples of compounds that can be reacted with isocyanate groups to provide chemical blocking include but are not limited to secondary or tertiary alcohols such as isopropanol and tertiary butanol, active methylene compounds such as dialkyl malonate, acetylacetone and alkyl acetoacetate, oximes such as acetoxime, methyl ethyl ketoxime and cyclohexanone oxime, lactams such as $\epsilon$-caprolactam, phenols such as phenol, chlorophenol, cresol, p-tert.-butylphenol, p-sec.-butylphenol, p-sec.-amylphenol, p-octylphenol and p-nonylphenol, heterocyclic hydroxyl compounds such as 3-hydroxypyridine, 8-hydroxyquinoline, 8-hydroxyquinaldine and the like. Water dispersible polyisocyanates rely on a slight variation from the chemical blocking reaction. U.S. Pat. Nos. 5,252,696 and 5,563,696 teach two different water dispersible polyisocyante compounds developed by Bayer that illustrate how dispersible polyisocyanates can be assembled without chemically converting the isocyanate groups to blocked isocyanate groups. They involve reacting an excess of reactive isocyanate groups with a deficiency of water dispersible reactive hydroxyl terminated poly(alkyleneoxide). Other companies manufacture dispersible isocyanates by other processes. The polyisocyanates desirably have a significant excess over two of isocyanate groups to hydroxyl groups so that after reaction with a poly(alkyleneoxide) that in excess of two isocyanate groups remain per water dispersible molecule. Many of the possible polyisocyanate compounds are dimerized, trimerized, or subjected to other coupling mechanisms that increase the number of reactive isocyanates per molecule before reacting with the hydroxyl terminated poly(alkyleneoxide). The references also teach utilizing isocyanate groups of different reactivity (e.g., aliphatic versus aromatic isocyanate molecules) with hydroxyl groups to allow better control of the isocyanate with hydroxyl reaction products. Apparently, the poly(alkyleneoxide) molecules sterically protect the free isocyanate groups of the dispersible polyisocyanates from reaction with water molecules similarly to the way that blocking groups chemically protect the isocyanate groups in blocked isocyanates.

The fibrous material is the main building block of the fibrous constructions. The binder will typically be present on calculated as dry binder (e.g., less volatile organics and water) weight from about 0.1 to about 50 wt. %, in some embodiments from 0.1 to 40 wt. %, and in still other embodiments from about 0.1 to about 20, 10, or 5 wt. % based on the weight of the dry fibers. The polyisocyanates, either water dispersible, blocked or both water dispersible and blocked, are generally present from about 0.01 to about 20 wt. % based on the dry binder weight, in some embodiments from 0.1 to about 10 wt. %, and in still other embodiments from about 0.1 to about 5 wt. %. Other conventional components to binders for nonwovens can also be added in conventional amounts. These include curatives (e.g., formaldehyde free or those using formaldehyde based reactants), UV blockers, fillers and extenders, pigments and colorants, oxidative stabilizers, adhesion promoters, sizing or tie material, scents, primers, antioxidants, biocides, and/or flocculants.

The purpose of increasing the strength and the ratio of wet strength to dry strength is to provide a) fibrous masses with lower amounts of binder and accordingly at lower cost; b) to provide fibrous masses with higher wet strength in some applications; such as personal care where body fluids may come in contact with the fibrous mass, industrial applications where the fibrous mass may be processed in water or solvent, paper towels, etc; c) increase wet strength without increasing stiffness of the fibrous mass; d) increase strength without switching to more costly fibers; and/or e) increase strength during initial manufacturing so that production rates can be reduced or curing times reduced, f) increased processing speeds by utilizing lower processing temperature or shorter temperature exposure, yet maintaining original target tensile properties; etc. While not wishing to be bound by theory, it is anticipated that better binding of the adhesive to the fibers results in better strength and better wetting and interpenetration of the fibers by the binder during coagulation and drying results in better ratios of wet strength to dry strength. Losses of strength on exposure to water and surfactants may be indicative of a weak interaction at the binder fiber interface that is partially replaced by water or surfactant when exposed to surfactant.

When the fibrous constructions were tested in tension, these adherent binder layers or masses would prevent the fibers from moving relative to each other to reduce the applied stress. Since the fibers tend to be significantly higher modulus than the binder, there is a phenomenon called strain amplification that occurs to binder phase. The binder phase has to disproportionately deform because the fibers, after any bends and slack in the fiber structure is eliminated tend to deform less than the binder.

Coalescent compounds may be present in the dispersed polymer or in the continuous phase to promote coalescence of the polymer particles into larger domains. The glass transition temperature (lower glass transition temperatures promote faster coalescence) and the application temperature (higher application or drying temperatures promotes faster coalescence) and drying temperatures will also affect the amount of coalescence of the particles of the binder. After coalescence of the polymer particles, it may be desirable in some applications to crosslink the polymers. This can be achieved via a variety of temperature, radiation, etc., activated crosslinking reactions well known to the industry. Most crosslinking reactions increase the tensile strength of the polymer itself but not the adherence between the binder and the fibers. Some crosslinking reactions may increase binder to fiber adherence.

The failure mode in the tensile properties (both dry and wet) will vary between fracture of the fibers, release of the fibers from the binder, and fracture in the binder under the high stress. If failure occurs at the fiber to binder interface or within the binder, this will allow the fibers to slide past each other and will eventually fracture the construction. It was unexpected that the dispersible polyisocyanates significantly increase wet tensile strength and the ratios of wet:dry tensile strength of the fibrous constructions. The poly(alkyleneoxide) of the dispersible polyisocyanates is typically seen as a surfactant. Typically, surfactants reduce adhesion of binder to fibers. Similarly, it was unexpected that the blocked polyisocyanates increase wet tensile strength and the ratio of wet:dry tensile strength. The data indicates that the wet tensile strength and wet:dry tensile strength ratios increase before the normal deblocking temperatures for the blocked isocyanate are even achieved. The precure increase in tensile strength suggests something other than simple crosslinking of the binder phase is occurring and causing the increased tensile strength and improved ratio of weight tensile to dry tensile strength.

The following examples illustrate the operation of the invention with various commercially available polymers (acrylic and styrene-butadiene). Tensile properties were evaluated using commercial Whatman® 3MM Chr Chromatography paper as the fibrous construction (base paper). The substrate was saturated on a padder using 10 psi pressure. The binder bath solids were approximately 30%. The sheets were dried after binder application on a steam can for one minute at 99° C. The dry polymer binder add-on was generally about 30% based on the weight of the substrate. The paper was conditioned at 21° C. and 50% relative humidity prior to testing for dry tensile strength and elongation. Paper properties were tested on the as-dried paper and after aging (curing) for three-minutes at temperatures of 121° C., 149° C., 177° C., or 204° C. Tensile properties were evaluated using a Thwing-Albert Intelect II tensile tester. One inch wide samples were die cut in the machine direction and pulled at twelve inches per minute using a two inch gauge length. Wet tensile was evaluated after soaking the samples for twenty minutes at room temperature in a 1% Tritone® X-100 in water solution. An average of testing four samples was recorded for each polymer.

TABLE 1

Acrylic Latex Modified with Dispersible and Blocked Polyisocyanate

| Binder | Cure Time min | Cure Temp ° C. | Dry Tensile Strength kN/m | Dry Tensile Elongation % | Wet Tensile Strength kN/m | Wet Tensile Elongation % | Wet/Dry Tensile Ratio |
|---|---|---|---|---|---|---|---|
| 23.25 wt % Hycar 26552 |  | RT | 11.23 | 9.40 | 0.95 | 7.06 | 0.08 |
|  | 3 | 121 | 11.07 | 9.04 | 1.43 | 8.90 | 0.13 |
|  | 3 | 149 | 11.13 | 8.42 | 3.25 | 11.52 | 0.29 |
|  | 3 | 177 | 11.40 | 8.65 | 5.55 | 12.10 | 0.49 |
|  | 3 | 204 | 9.14 | 6.33 | 5.13 | 8.65 | 0.56 |
| 24.57 wt % Hycar 26552 |  | RT | 11.58 | 9.21 | 4.86 | 12.60 | 0.42 |
| 0.25% Bayhydur XP-7063 | 3 | 121 | 11.44 | 8.48 | 4.93 | 11.79 | 0.43 |
|  | 3 | 149 | 11.79 | 8.29 | 5.80 | 13.32 | 0.49 |
|  | 3 | 177 | 11.75 | 736 | 6.46 | 12.18 | 0.55 |
|  | 3 | 204 | 9.76 | 5.33 | 5.47 | 8.44 | 0.56 |
| 24.30 wt % Hycar 26552 |  | RT | 11.61 | 8.71 | 5.91 | 12.27 | 0.51 |
| 0.73% Bayhydur XP-7063 | 3 | 121 | 11.77 | 7.86 | 6.33 | 12.19 | 0.54 |
|  | 3 | 149 | 12.38 | 7.91 | 6.88 | 14.58 | 0.56 |
|  | 3 | 177 | 12.17 | 7.03 | 7.14 | 12.45 | 0.59 |
|  | 3 | 204 | 10.33 | 5.75 | 6.45 | 8.82 | 0.62 |

TABLE 1-continued

Acrylic Latex Modified with Dispersible and Blocked Polyisocyanate

| Binder | Cure Time min | Cure Temp °C. | Dry Tensile Strength kN/m | Dry Tensile Elongation % | Wet Tensile Strength kN/m | Wet Tensile Elongation % | Wet/Dry Tensile Ratio |
|---|---|---|---|---|---|---|---|
| 23.49 wt % Hycar 26552 | | RT | 10.85 | 9.23 | 1.08 | 6.27 | 0.10 |
| 0.23 wt % Repearl MF | 3 | 121 | 10.99 | 9.11 | 1.99 | 9.39 | 0.18 |
| | 3 | 149 | 11.30 | 8.85 | 4.84 | 11.60 | 0.43 |
| | 3 | 177 | 10.99 | 8.35 | 5.42 | 11.36 | 0.49 |
| | 3 | 204 | 10.27 | 7.27 | 6.25 | 11.61 | 0.61 |
| 24.20 wt % Hycar 26552 | | RT | 11.01 | 8.61 | 1.39 | 7.19 | 0.13 |
| 0.73 wt % Repearl MF | 3 | 121 | 11.05 | 8.44 | 2.62 | 9.03 | 0.24 |
| | 3 | 149 | 11.85 | 8.95 | 6.81 | 12.93 | 0.57 |
| | 3 | 177 | 11.83 | 8.31 | 7.40 | 13.75 | 0.63 |
| | 3 | 204 | 11.07 | 7.57 | 7.37 | 11.53 | 0.67 |

Bath solids - 33-35%, Binder Add-on 32% +/− 2%

TABLE 2

Styrene-Butadiene Latex Modified with Dispersible and Blocked Polyisocyanate

| Binder | Cure Time min | Cure Temp °C. | Dry Tensile Strength kN/m | Dry Tensile Elongation % | Wet Tensile Strength kN/m | Wet Tensile Elongation % | Wet/Dry Tensile Ratio |
|---|---|---|---|---|---|---|---|
| 21.88 wt % Good-Rite SB-1168 | | RT | 8.81 | 5.66 | 0.65 | 1.70 | 0.07 |
| | 3 | 121 | 9.91 | 6.62 | 2.99 | 7.16 | 0.30 |
| | 3 | 149 | 11.59 | 7.96 | 5.01 | 9.17 | 0.43 |
| | 3 | 177 | 11.54 | 7.00 | 5.45 | 8.20 | 0.47 |
| | 3 | 204 | 8.95 | 4.77 | 3.99 | 5.27 | 0.45 |
| 22.02 wt % Good-Rite SB-1168 | | RT | 8.76 | 5.70 | 0.79 | 1.77 | 0.09 |
| | 3 | 121 | 11.00 | 7.69 | 3.63 | 8.07 | 0.33 |
| 0.22 wt % Repearl MF | 3 | 177 | 12.29 | 7.46 | 6.81 | 8.77 | 0.55 |
| | 3 | 204 | 9.02 | 4.73 | 4.82 | 5.87 | 0.53 |
| 22.35 wt % Good-Rite SB-1168 | | RT | 8.86 | 5.70 | 0.84 | 1.77 | 0.09 |
| | 3 | 121 | 11.33 | 7.21 | 4.13 | 8.61 | 0.36 |
| 0.67 wt % Repearl MF | 3 | 149 | 13.19 | 8.27 | 7.58 | 10.70 | 0.57 |
| | 3 | 177 | 12.78 | 7.59 | 8.00 | 9.99 | 0.63 |
| | 3 | 204 | 9.86 | 4.67 | 5.69 | 5.78 | 0.58 |
| 22.78 wt % Good-Rite SB-1177 | | RT | 10.58 | 7.72 | 0.51 | 1.71 | 0.05 |
| | 3 | 121 | 11.00 | 7.93 | 1.48 | 4.41 | 0.13 |
| | 3 | 149 | 11.47 | 7.93 | 3.80 | 8.64 | 0.33 |
| | 3 | 177 | 11.52 | 7.68 | 5.20 | 8.06 | 0.45 |
| | 3 | 204 | 8.39 | 4.01 | 3.82 | 4.96 | 0.46 |
| 22.02 wt % Good-Rite SB-1177 | | RT | 10.89 | 7.47 | 0.68 | 2.22 | 0.06 |
| | 3 | 121 | 11.66 | 7.68 | 2.64 | 6.70 | 0.23 |
| 0.22 wt % Repearl MF | 3 | 149 | 11.93 | 7.97 | 6.29 | 9.07 | 0.53 |
| | 3 | 204 | 8.69 | 4.01 | 4.43 | 5.44 | 0.51 |
| 22.46 wt % Good-Rite SB-1177 | | RT | 11.02 | 7.21 | 0.87 | 2.61 | 0.08 |
| | 3 | 121 | 12.01 | 8.09 | 3.36 | 7.60 | 0.28 |
| 0.67 wt % Repearl MF | 3 | 149 | 12.61 | 8.51 | 6.72 | 10.80 | 0.53 |
| | 3 | 177 | 12.40 | 7.76 | 7.46 | 9.71 | 0.60 |
| | 3 | 204 | 9.44 | 4.33 | 5.15 | 5.66 | 0.55 |

Bath solids - 33-35% by weight polymer
Binder Add-on 32% +/− 2% based on fiber matt weight

TABLE 3

Acrylic Latex Modified with Dispersible and Blocked Polyisocyanate

| Binder | Cure Time min | Cure Temp °C. | Dry Tensile Strength kN/m | Dry Tensile Elongation % | Wet Tensile Strength kN/m | Wet Tensile Elongation % | Wet/Dry Tensile Ratio |
|---|---|---|---|---|---|---|---|
| 23.02 wt % Hycar 26469 | | RT | 10.51 | 7.51 | 1.13 | 5.52 | 0.11 |
| | 3 | 121 | 10.53 | 7.21 | 2.75 | 8.95 | 0.26 |
| | 3 | 149 | 11.40 | 8.15 | 4.50 | 10.70 | 0.39 |
| | 3 | 177 | 11.49 | 8.00 | 5.87 | 10.90 | 0.51 |
| | 3 | 204 | 10.30 | 6.65 | 5.41 | 9.02 | 0.53 |

TABLE 3-continued

Acrylic Latex Modified with Dispersible and Blocked Polyisocyanate

| Binder | Cure Time min | Cure Temp °C. | Dry Tensile Strength kN/m | Dry Tensile Elongation % | Wet Tensile Strength kN/m | Wet Tensile Elongation % | Wet/Dry Tensile Ratio |
|---|---|---|---|---|---|---|---|
| 21.72 wt % Hycar 26469 |   | RT | 10.44 | 7.47 | 1.29 | 5.77 | 0.12 |
| 0.22 wt % Repearl MF | 3 | 121 | 10.93 | 7.55 | 3.49 | 9.96 | 0.32 |
|   | 3 | 149 | 11.70 | 7.85 | 5.25 | 11.00 | 0.45 |
|   | 3 | 177 | 11.67 | 7.71 | 6.58 | 10.60 | 0.56 |
|   | 3 | 204 | 11.19 | 6.73 | 6.44 | 9.09 | 0.58 |
| 21.77 wt % Hycar 26469 |   | RT | 10.63 | 7.34 | 1.56 | 6.62 | 0.15 |
| 0.65 wt % Repearl MF | 3 | 121 | 11.51 | 7.54 | 4.26 | 10.30 | 0.37 |
|   | 3 | 149 | 11.96 | 8.05 | 6.27 | 11.30 | 0.52 |
|   | 3 | 177 | 12.15 | 7.92 | 7.41 | 10.80 | 0.61 |
|   | 3 | 204 | 11.03 | 6.11 | 7.34 | 9.67 | 0.67 |
| 21.94 wt % Hycar 26106 |   | RT | 14.92 | 5.88 | 2.71 | 4.45 | 0.18 |
|   | 3 | 121 | 15.71 | 6.39 | 7.16 | 7.61 | 0.46 |
|   | 3 | 149 | 16.32 | 6.67 | 8.83 | 7.65 | 0.54 |
|   | 3 | 177 | 15.27 | 5.38 | 7.97 | 7.40 | 0.52 |
|   | 3 | 204 | 12.61 | 3.05 | 5.08 | 4.09 | 0.40 |
| 21.94 wt % Hycar 26106 |   | RT | 15.10 | 5.69 | 3.03 | 4.52 | 0.20 |
| 0.22 wt % Repearl MF | 3 | 121 | 15.73 | 6.16 | 7.48 | 7.93 | 0.48 |
|   | 3 | 149 | 17.09 | 6.90 | 9.35 | 5.89 | 0.55 |
|   | 3 | 177 | 16.04 | 5.70 | 9.53 | 7.76 | 0.59 |
|   | 3 | 204 | 13.38 | 3.46 | 6.37 | 4.85 | 0.48 |
| 21.94 wt % Hycar 26106 |   | RT | 15.04 | 6.04 | 2.92 | 5.52 | 0.19 |
| 0.67 wt % Repearl MF | 3 | 121 | 16.11 | 6.28 | 7.79 | 8.95 | 0.48 |
|   | 3 | 149 | 16.71 | 6.24 | 9.18 | 10.70 | 0.55 |
|   | 3 | 177 | 16.43 | 6.02 | 10.09 | 10.90 | 0.61 |
|   | 3 | 204 | 13.27 | 3.51 | 7.27 | 9.02 | 0.55 |

Bath solids - 33-35% by wt.
Binder Add-on 32% +/− 2% based on weight of fiber matt

TABLE 4

Fibers Substrate with Blocked Isocyanate, Latex, and Blend of Latex with Blocked Isocyanate

| Binder | Cure Time min | Cure Temp °C. | Dry Tensile Strength kN/m | Dry Tensile Elongation % | Wet Tensile Strength kN/m | Wet Tensile Elongation % | Wet/Dry Tensile Ratio |
|---|---|---|---|---|---|---|---|
| 0.45 wt. % Repearl MF |   | RT | 4.35 | 2.14 | 0.51 | 1.67 | 0.12 |
|   | 3 | 121 | 4.49 | 2.13 | 0.91 | 1.99 | 0.20 |
|   | 3 | 149 | 5.31 | 2.53 | 1.82 | 3.37 | 0.34 |
|   | 3 | 177 | 5.04 | 2.18 | 2.09 | 3.46 | 0.42 |
|   | 3 | 204 | 4.92 | 1.95 | 2.53 | 4.09 | 0.52 |
| 1.43 wt % Repearl MF |   | RT | 3.54 | 1.53 | 0.46 | 1.75 | 0.13 |
|   | 3 | 121 | 4.08 | 1.85 | 1.05 | 2.52 | 0.26 |
|   | 3 | 149 | 4.20 | 1.75 | 2.43 | 3.95 | 0.58 |
|   | 3 | 177 | 5.28 | 2.23 | 2.79 | 4.17 | 0.53 |
|   | 3 | 204 | 5.50 | 1.18 | 2.77 | 3.94 | 0.50 |
| 25.5 wt % Hycar 26552 |   | RT | 11.10 | 7.6 | 1.08 | 4.15 | 0.10 |
|   | 3 | 121 | 11.54 | 7.6 | 1.63 | 5.59 | 0.14 |
|   | 3 | 149 | 11.59 | 7.17 | 3.62 | 9.48 | 0.31 |
|   | 3 | 177 | 11.64 | 7.16 | 5.93 | 10.01 | 0.51 |
|   | 3 | 204 | 9.48 | 5.08 | 5.12 | 6.79 | 0.54 |
| 25.35 wt % Hycar 26552 |   | RT | 11.85 | 7.74 | 2.82 | 7.84 | 0.24 |
| 0.25 wt % Repearl MF | 3 | 121 | 12.06 | 7.87 | 5.49 | 8.69 | 0.46 |
|   | 3 | 149 | 12.21 | 7.6 | 5.75 | 10.66 | 0.47 |
|   | 3 | 177 | 11.56 | 7.02 | 6.75 | 10.56 | 0.58 |
|   | 3 | 204 | 9.86 | 6.07 | 5.54 | 6.8 | 0.55 |
| 25.12 wt % Hycar 26552 |   | RT | 11.93 | 7.42 | 3.57 | 9.38 | 0.30 |
| 0.75 wt % Repearl MF | 3 | 121 | 11.93 | 7.69 | 4.70 | 9.77 | 0.39 |
|   | 3 | 149 | 12.38 | 7.84 | 6.62 | 10.95 | 0.54 |
|   | 3 | 177 | 12.06 | 7.07 | 7.55 | 10.82 | 0.63 |
|   | 3 | 204 | 9.86 | 4.89 | 5.67 | 6.8 | 0.58 |

Hycar ® 26552 is a commercially available acrylic latex with an acid number of approximately 23 ml of 1 N KOH/g of sample, glass transition temperature of −15° C. and solids content of 47.5% available from Noveon, Inc., 9911 Brecksville Road, Cleveland, Ohio 44141-3247.
Repearl ™ MF is a commercially available blocked isocyanate supplied as a dispersion with active content of approximately 29%, available from Mitsubishi International Corporation, 520 Madison Avenue, New York, New York 10022. Its debolking termperature is believed to be about 135° C.

TABLE 4-continued

Fibers Substrate with Blocked Isocyanate, Latex, and Blend of Latex with Blocked Isocyanate

| Binder | Cure Time min | Cure Temp ° C. | Dry Tensile Strength kN/m | Elongation % | Wet Tensile Strength kN/m | Elongation % | Wet/Dry Tensile Ratio |
|---|---|---|---|---|---|---|---|

Bayhydur ® XP-7063 is a commercially available water-dispersible polyisocyanate based on hexamethylene diisocyanate available from Bayer Corporation, 100 Bayer Road, Pittsburgh, Pennsylvania 15205.
Good-Rite ® SB-1168 is a commercially available self crosslinking styrene-butadiene latex with an acid number of approximately 5, glass transition temperature of −6° C. and solids content of 50.0% available from Noveon, Inc., 9911 Brecksville Road, Cleveland, Ohio 44141-3247.
Good-Rite ® SB-1177 is a commercially available styrene butadiene latex with an acid number of approximately 25, glass transition temperature of −23° C. and solids content of 52.0% available from Noveon, Inc., 9911 Brecksville Road, Cleveland, Ohio 4414 1-3247.
Hycar ® 26469 is a commercially available acrylic latex with an acid number of approximately 18, glass transition temperature of −4° C. and solids content of 47.5% available from Noveon, Inc., 9911 Brecksville Road, Cleveland, Ohio 44141-3247.
Hycar ® 26106 is a commercially available self-crosslinking acrylic latex with an acid number of approximately 8, glass transition temperature of +29° C. and solids content of 47.5% available from Noveon, Inc., 9911 Brecksville Road, Cleveland, Ohio 44141-3247.
Hycar ® 1562x28 is a commercially available acrylonitrile-butadiene latex with a glass transition temperature of −25° C. and solids content of 41.0% available from Noveon, Inc., 9911 Brecksville Road, Cleveland, Ohio 44141-3247.

The data in the first part of Table 1 indicates that 0.25% or 0.73% of Bayhydur™ XP-7063 (water dispersible polyisocyanate) with Hycar™ 26552 (an acrylic latex) has a positive effect on wet:dry tensile strength. The samples with 0.25% or 0.73% of the polyisocyanate achieved about 0.50 wet:dry tensile after curing 3 minutes at only 149° C. or room temperature (23-25° C.) as compared with 3 minutes cure at 177° C. without the polyisocyanate. The later part of Table 1 shows a lesser benefit with the cure temperatures with 0.23% or 0.73% Repearl™ MF (blocked polyisocyanate) resulting in the 0.50 ratio of wet:dry tensile at cure temperatures of 177° and 149° C. respectively as compared to 177° for the control without a polyisocyanate.

The data in Table 2 shows the required curring temperature to achieve the 0.50 ratio of wet:dry tensile strength was achieved with 0.22% or 0.67% Repearl™ MF (blocked polyisocyanate) with Good-Rite™ SB-1168 after 3 minutes at 149° (both samples) as compared to 177° C. without the polyisocyanate. Similarly with Good-Rite™ SB-1177 the addition of the Repearl™MF polyisocyanate resulted in the cure temperature going down from 204° to 177 and 149° C. respectively to achieve the 0.50 wet:dry tensile ratio.

The data in Table 3 shows that 0.22% or 0.65% Repearl™ MF when used with Hycar™ 26469 resulted in a decrease of the required cure temperature to achieve a 0.50 ratio of wet:dry tensile from 177° to 149° C. (both samples). The results with Repearl™ with Hycar™ 26106 indicated the cure temperate to achieve 0.50 wet:dry tensile ratio remained at 149° C. with and without Repearl™ MF, a slight increase in both wet tensile and dry tensile occurred with the polyisocyanate.

The data in Table 4 illustrates the effect of using Repearl™MF as the sole binder for fibers as compared to using Repearl™MF in combination with a polymeric binder such as Hycar™ 26552 of Table 1. The controls and some duplicates of Table 4 duplicate well the results in Table 1. The amount of Repearl™MF when used as the sole binder is slightly higher (0.45 wt. % or 1.43 wt. % Repearl™MF) than when used in combination with a polymeric binder (0.25% or 0.75% Repearl™MF). The wet tensile strength of the fibers alone is considered near zero. When the Repearl™MF (blocked isocyanate) is used without high temperature curing, it is anticipated to act more as a gummy non-reactive binder than as a coupling agent (one needs to get to 135° C., deblocking temperature, to regenerate the reactive isocyanate groups). As the curing temperature of the samples with Repearl™MF increased the dry tensile strength went from 4.35 kN/m (without elevated temperature curing to 5.31 kN/m and 5.50 kN/m max., an increase of about 1 to 1.1 kN/m. Wet:dry tensile ratio did not increase to the 0.5 value with 0.45 wt. % Repearl™MF as the sole binder until the cure temperature reached 204° C. While the dry tensile strength for Repearl™MF as the sole binder showed a slight binder dosage sensitivity, over the range studied, the wet tensile strength seemed independent of binder dosage. The sample with 1.43 wt. % Repearl™MF reached a 0.50 ratio of wet:dry tensile at 149° C. cure. The wet tensile strength of the samples with Repearl™MF never got above 4.17 kN/m.

The fiber samples with a large amount of polymeric binder got significantly higher dry and wet tensile strengths (max. of 11.64 and 5.93 kN/m, respectively) than those with Repearl MF only. They also showed higher elongation at break (indicating significantly more total deformation before fracture). The samples with combinations of Repearl™MF and polymeric binder showed increases in wet:dry tensile ratio even with room temperature curing (a desirable feature as curing temperatures could be reduced and/or total binder could be reduced). Both the dry and wet tensile strengths of samples with both Repearl™MF and Hycar™ 26552 were increased over samples with either Repearl™MF alone or Hycar™ 26552 alone.

While not wishing to be bound by theory, it is anticipated that the combination of a blocked or water-dispersible polyisocyanate with a polymeric resin may result in a disproportionate amount of the polyisocyanate going to the fiber surfaces where it may compatibilize the fibers and polymer promoting more physical interaction (resulting in stronger dry and wet tensiles without deblocking the polyisocyanate). The blend of polyisocyanate and polymeric binder is much easier and cost effective to apply than a two step process where a binder or size is applied to the fibers (possibly with de-watering and drying) and then a separate binder dispersed in an aqueous phase is applied.

The fibrous constructions of this disclosure can be used in a variety of applications known for fibrous constructions and nonwovens. These include fabrics for a) reinforcing a variety of thermoplastics, thermosets, concrete, shingles, tape, etc; b) for clothing, industrial equipment, personal care products, cleaning applications; and c) paper and board applications. They can be medical nonwovens, masking tapes, sandpaper base, book covers, gasketing, wipes, liquid filter media, air/gas filter media, apparel labels, etc. The fibrous constructions can also be used for filters, ropes, and cords.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A binder for a nonwoven composite of non-oleophilic fibrous material comprising:
   a) a dispersed phase in an aqueous media of polymer from the polymerization of unsaturated monomer(s) wherein said unsaturated monomer(s) is comprised of a) at least 30 weight percent repeating units from a C1-C8 alkyl (alk)acrylate, in combination with,
   b) a water dispersible and/or blocked polyisocyanate component dispersed in an aqueous media, said polyisocyanate component present from 0.01 to about 20 weight percent based on the weight of the binder less the volatile portion of said aqueous media, and wherein said water dispersible polyisocyanate component comprises the reaction product of reactive isocyanate groups with a deficiency of water dispersible reactive hydroxyl terminated poly(alkyleneoxide) and wherein said blocked polyisocyanate component is characterized by an ability to regenerate two or more isocyanate groups and the blocking molecule from said blocked polyisocyanate component by heating.

2. A fibrous construction comprising a binder according to claim 1 in combination with a major amount of non-oleophilic fibrous material formed into a nonwoven composite.

3. A fibrous construction according to claim 2, wherein said fibrous material is cellulosic, cotton, glass, polyester or blends thereof.

4. A fibrous construction according to claim 2, wherein said polyisocyanate component is present from about 0.1 to about 10 percent by weight based on the dry binder weight.

5. A fibrous construction according to claim 4, wherein said fibrous construction is formed into a paper, matt, or rope.

6. A fibrous construction according to claim 4, wherein said fibrous construction is formed into a reinforcing element for an unsaturated resin composition.

7. A fibrous construction according to claim 2, wherein said fibrous material has an aspect ratio of at least 2:1 and at least one weight average dimension of said fibrous material is at least 10 um.

8. A fibrous construction according to claim 7, wherein said polymer and said polyisocyanate of said dispersed phase is substantially simultaneously coagulated onto said fibrous material.

9. A fibrous construction according to claim 2, wherein said dispersed polymer phase is coagulated onto said fibrous material in such a manner that said polymer phase restricts said fibrous material from sliding past each other during tensile strength measurements.

10. A fibrous construction according to claim 2, wherein said polymer of said dispersed phase is substantially formaldehyde free during curing.

11. A fibrous construction according to claim 2, wherein said fibrous material and binder in a nonwoven having ratio of wet tensile to dry tensile of at least 0.20 after curing 3 minutes at 100° C.

12. A fibrous construction according to claim 11, wherein said fibrous material and binder result in a nonwoven that has a 100% increase in the ratio of wet:dry tensile strength over an otherwise identical fibrous construction lacking said polyisocyanate component after curing both samples 3 minutes at 100° C.

* * * * *